Nov. 24, 1959  A. V. L. C. DEBRIE  2,913,885
FRICTION DRIVE FOR PHOTOGRAPHIC OR CINEMATOGRAPHIC
FILMS AND THE LIKE
Filed Feb. 5, 1958
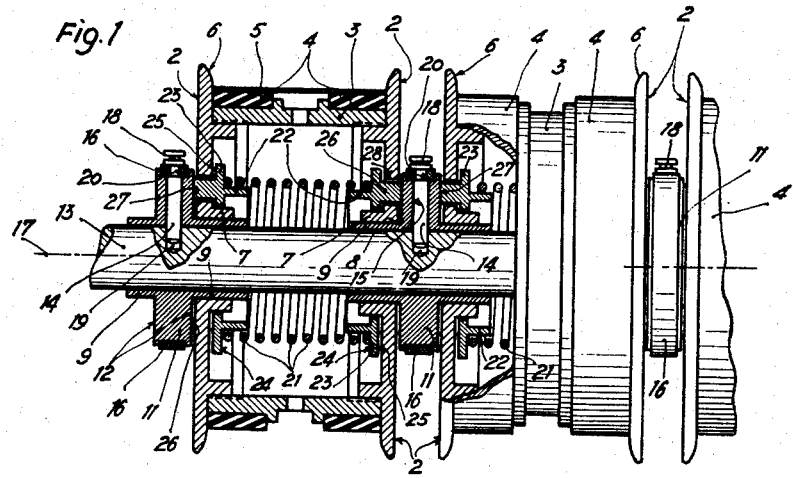
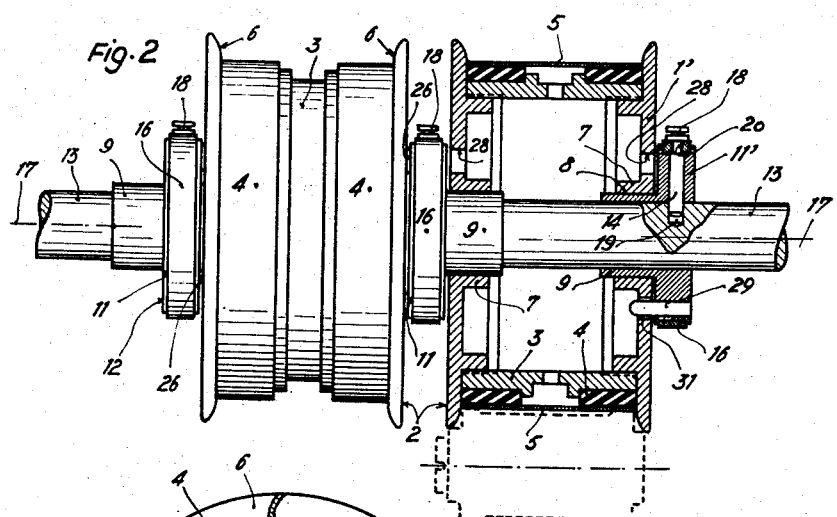
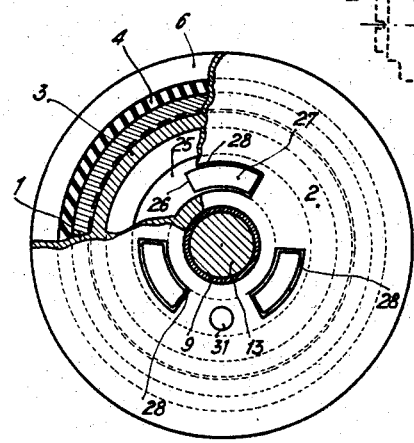
Inventor:
André Victor Léon Clament Debrie
by:
Michael S. Striker
Attorney

United States Patent Office 2,913,885
Patented Nov. 24, 1959

2,913,885

FRICTION DRIVE FOR PHOTOGRAPHIC OR CINEMATOGRAPHIC FILMS AND THE LIKE

André Victor Léon Clement Debrie, Paris, France

Application February 5, 1958, Serial No. 713,339

Claims priority, application France February 15, 1957

6 Claims. (Cl. 64—30)

The object of the invention relates to driving drums for driving film passing over these drums which are themselves mounted in series on a common driving shaft with the interposition of a sliding coupling, limiting the driving torque of each drum which can slip independently of its neighbours.

This driving device is distinguished from the known devices by the great simplicity of mounting of the drums in series on the driving shaft and of the driving means in relation with that shaft by means of parts which are identical for all the drums, which are free to slip with respect to the said shaft.

The object of the invention is a friction driving device for a series of coaxial drums for driving a film passing over them mounted on a common driving shaft, consisting essentially in drums provided at their periphery with externally cylindrical linings over which the film passes without slip, these drums being provided with portions, fast for rotation with them, which project beyond their lateral faces and are constantly pushed back externally by elastic means which force them against the corresponding faces of the collars with parallel faces of rings which are movable by sliding on the common driving shaft, these rings being retained in position and fixed to the shaft by elastically-urged locking devices passing into housings in this shaft, and capable of being released for dismantling, at the will of the operator, each drum being pierced axially for the free passage of the driving shaft and rotating on bearing surfaces formed on each side of it by a coaxial cylindrical extension on the side of each ring which faces it, projecting beyond the collar of this ring and passing into a corresponding bore in the drum, of which it ensures the centering, the projecting portions being rigidly fast for rotation with this drum and being suitably pressed between two rings placed in position on the shaft and being themselves held in position and driven in rotation, with a torque-limiting effect, by the friction between these members and the rings.

In order to assist a better understanding of the invention, the accompanying drawings show one form of embodiment thereof, these being given by way of example without limitation.

Fig. 1 shows in longitudinal cross-section and in partial cross-section with parts broken away, drums in accordance with the invention mounted on a running portion of the driving shaft.

Fig. 2 shows the two first drums in accordance with the invention, the first of which towards the extremity of the shaft on the film return side, is fixed for rotation on the shaft while the others are drivable with slip, the movable mounting of this drum on the shaft being effected by the same system of rings as the others.

Fig. 3 shows an end view with parts broken away and in partial cross-section of a drum in position on the shaft, the fixing ring being removed, on the nearest side of the plane of its face cooperating with the drum of the side which is seen.

In these figures, the same parts have been given the same reference numbers.

In the example shown, the drums are constituted by lateral cheeks 1 with flat outer faces 2, assembled by an annular part 3 which receives two elastic rings 4 forming the outer cylindrical surface on which the film passes to be driven. The lateral cheeks are formed externally with edges 6 for guiding the film 5 transversely.

Towards their centres, the cheeks 1 are provided internally with a bearing surface 7 bored at 8 so as to pivot coaxially on lateral cylindrical extensions 9 of rings 11 having flat faces 12 and slidably mounted on the cylindrical general-drive shaft 13.

Each ring 11 is provided with a cylindrical nipple 14 which is guided in a radial hole 15 formed in this ring. This nipple 14 tends constantly to be urged towards the axis of rotation 17 under the action of a spring 16, constituted by a bracelet of rubber or similar elastic material through which the nipple is passed. Spring 16 engages the said nipple in a groove 20 thereof, and spring 16 elastically enclosed the ring 11.

Each nipple 14 projects externally above the bracelet 16 by a portion 18 which can readily be gripped by the hand, which enables the nipple to be withdrawn by a simple pull from the corresponding housing 19 in the shaft 13 and to enable the ring 11 to slide on the shaft for the dismantling or successive placing in position of the said rings and the drums which are pivotally mounted on these rings.

The distances between the axes of the housings 19 are such that the rings and the drums are located longitudinally in their precisely pre-determined positions. Inside each drum, a cylindrical coil spring 21 having its axis parallel to the shaft 13 which passes through it, is borne at each of its extremities on a cylindrical portion 22 of an annular plate 23 slidably guided on a cylindrical external concentric portion of the bearing surfaces 7.

This spring 21 constantly urges the plates 23 outwards, its extremities being supported against the inner faces 24 of the plates.

The outer faces 25 of these plates 23 are provided in relief with three elementary parts 26 which are spaced 120° apart and de-limited for example in a thick cylinder coaxial with the shaft between radial planes, and limited in a single plane normal to the said shaft by surfaces 27 which are supported on the flat face 12 of the corresponding ring.

The parts 26 are guided in orifices 28 of corresponding shape and pass through the side walls of the drum from which they project.

The friction between these parts and the faces 12, due to the pressure of the spring 21, drives the drum in rotation with them, so that if the resistance of the film exceeds the pre-determined value, regulated by the characteristics of the spring 21, amongst other things, the drum is no longer driven, while the surfaces 27 of the parts 26 slip against the corresponding faces 12 of the ring 11.

The first drum is not provided with a spring 21 and plates 23, and it is rigidly fixed for rotation with the shaft 13 by means of a fixed finger 29 which projects transversely into a ring 11 and passes into a corresponding hole 31 pierced in the side 1' of the said drum.

The fixing of the ring 11' is identical with that of the running rings 11.

Towards the extremities of the shaft 13, the rings 11' may be provided only with the hub 9 corresponding at their inner faces, in order to reduce the overall size.

Only the end ring on the shaft carrying the drum which is fixed to it is provided with the finger 29. The corresponding side face 1' can, like the running faces 1, be provided with openings 28 which are not used in this case, and conversely the other faces can be provided with unused holes 31, with the object of employing standardised parts.

The operation of the device will be quite clear from its constitution alone; the springs 21 being suitably calculated, the driving and slip torques are perfectly regular and ensure the drive of the film without jerks, in particular in the case of machines for treatment of the film in laboratory tubes in coils to which it is especially adapted.

In the device of the present application, the assembly and the dismantling of the drums mounted on the shaft, and of their friction couplings, can be carried out with remarkable ease and without tools.

In fact, it is only necessary to slip on or to withdraw the rings by sliding them along the shaft, when they have been freed by a simple pull on the extremity 18 of the locking finger and keeping it outside the generator line along which the housings 19 are pierced, by rotation of the ring.

The drum follows without any other operation and then there are successively and alternately freed a ring, a drum, a ring, etc.

Without passing out of the scope of the invention, modifications may be made to the form of embodiment shown.

The elastic locking means for the rings on the shaft, and the actual locking device could be made in a different way to obtain the same advantages of retention in position and practical removal. The ring of plastic material such as rubber could be replaced by a metal spring, either in a spiral ring or of piano wire or of an elastic blade which embraces partly or wholly the circumference of the ring.

The latter may furthermore have any shape of contour other than circular and the locking on the shaft may be effected by any locking means which is easy to free, other than a radial finger, which is a simple matter to conceive.

Instead of the simple adherence of the film on an external plastic lining on the drums, it would still fall within the scope of the invention to provide these driving drums, these being capable of rotation with adjustable friction on the shaft, with teeth or the like for driving by the cinematographic or like film.

What I claim is:

1. A device for driving photographic or cinematographic films and the like, of the kind incorporating a plurality of driving drums mounted in series on a common driving shaft, said devices comprising: a plurality of rings individually and slidably mounted on said common shaft, each ring having two flat radial faces; means for locating and removably locking said rings at uniformly-spaced intervals along the said shaft; longitudinal tubular extensions formed integrally one on each side of each ring and adapted to fit on said common shaft, the outer surfaces of said extensions acting as bearing surfaces; a plurality of film-driving drums mounted between said rings on said common shaft, each drum having its end cheeks bored centrally and axially so as to fit and be capable of rotation on the bearing surfaces of said ring extensions; and an elastically-loaded friction device provided to act between each end-cheek of each drum and the corresponding flat radial surfaces of the associated rings, whereby the torque applied to said driving shaft is transmitted positively to said rings and frictionally to said drums, which slip with respect to said rings when the resistance torque exceeds a predetermined value.

2. A device as claimed in claim 1, in which the said locating and locking means for said rings comprises: at least one radial bore in each ring, co-operating with a corresponding radial bore formed in said driving shaft, the said latter bores being uniformly spaced along the length of said common shaft; and a cylindrical nipple withdrawably engaged in said radial bores, and elastically urged towards said common shaft, thereby facilitating rapid assembly and removal of each ring and drum combination on or from the said common shaft.

3. A device as claimed in claim 1, in which the said friction device comprises, for each drum: a pair of annular members mounted respectively adjacent the inner sides of the end cheeks of said drum; a plurality of segment-shaped orifices formed in said end-cheeks adjacent the flat sides of said rings; a corresponding plurality of segments formed integrally on the outer sides of said annular members, and adapted to pass through said orifices to engage said flat sides; and elastic means for maintaining said segments in frictional engagement with the flat sides of said rings.

4. A device as claimed in claim 1, in which each said drum is provided, on its peripheral surface, with at least one elastic ring, so as to give adequate adhesion between the film and the peripheral surface of said drum.

5. A device as claimed in claim 1, in which the end-cheeks of each drum project beyond the periphery of said drum in order to serve as guides for the driven film.

6. A device as claimed in claim 1, in which the last drum towards the extremity of said driving shaft, on the film return-side, is fixed for rotation with said shaft by means of a driving-pin passing transversely through orifices pierced transversely through the end-ring and through the corresponding end-cheek of said drum.

References Cited in the file of this patent

UNITED STATES PATENTS

| | | |
|---|---|---|
| 832,974 | Hunt | Oct. 9, 1906 |
| 2,633,305 | Kaylor | Mar. 31, 1953 |
| 2,729,079 | Kuehn | Jan. 3, 1956 |
| 2,765,991 | Frey et al. | Oct. 9, 1956 |